United States Patent [19]

Bolton et al.

[11] Patent Number: 5,061,748

[45] Date of Patent: Oct. 29, 1991

[54] FIRE RESISTANT WINDOWS

[75] Inventors: Nelson Bolton, Trumbauersville; W. Novis Smith, Philadelphia, both of Pa.

[73] Assignee: Artistic Glass Products Company, Trumbauersville, Pa.

[21] Appl. No.: 546,232

[22] Filed: Jun. 28, 1990

[51] Int. Cl.$^5$ ................................................ C08L 5/04
[52] U.S. Cl. ..................................... 524/827; 524/394
[58] Field of Search ................................. 524/394, 827

[56] References Cited

FOREIGN PATENT DOCUMENTS 60-006780 1/1985 Japan .

*Primary Examiner*—Joseph L. Schofer
*Assistant Examiner*—Jeffrey T. Smith
*Attorney, Agent, or Firm*—John Lezdey

[57] ABSTRACT

An optically transparent aqueous intumescent gel for use with transparent laminates comprising about 5 to 30% by weight acrylamide, about 0 to 4% by weight of a crosslinking agent, about 5 to 28% by weight of an ammonium or alkali metal salt of an alkanoic acid having 1 to 4 carbon atoms, about 0.05 to 10% by weight of a polymerization catalyst, and water, and a laminate with the gel.

9 Claims, 1 Drawing Sheet

FIRE RESISTANT WINDOWS

FIELD OF THE INVENTION

The present invention relates to fire resistant transparent panes made of a multiplicity of sheets having a layer of a novel aqueous polymerized organic gel. More particularly, there is provided a fire resistant security laminate which contains a novel intumescent gel.

BACKGROUND OF THE INVENTION

It is known to provide a pair of glass sheets with an aqueous gel therebetween, which under the action of heat radiation is transformed into an insulating foam.

Merely providing an aqueous gel between two sheets of glass is insufficient to provide a glazing unit which renders a window fire proof for a sufficient period of time to permit escape or assistance to arrive.

The prior art gels which are currently utilized in glazing units fail to take into consideration utilization of the glass panes at low temperatures and in locations of repeated shock. Moreover, these gels become cloudy at low temperatures and require heating means to maintain optical clarity.

Some of the problems with many of the prior art fire proof panes is that high heat causes the panes to shatter and expose the aqueous gel to the flames. With high intense heat the first pane shatters exposing both the gel and the second pane to high heat. Shattering of both panes does not provide any surface for the gel to remain in place. Consequently, the double pane glasses do not provide sufficient fire deterency and cannot be utilized in security installations.

In security installations that are presently being utilized, transparent laminates of glass, polyurethane, polycarbonate and ionomers are used as protective barriers. Moreover, optically transparent laminates which are used in prisons, psychiatric installations and commercial buildings must not only be resistant to physical and ballistic attacks, but capable of withstanding high heat and direct flames for a prolonged period of time to permit people to move to safety or for assistance to arrive. This combination of impact resistance and fire resistance has been difficult to achieve.

To provide security or armor glass with resistance to cracking and breaking during high heat and flames, it was common to include in the glass pane a wire mesh. However, such a solution to the problem resulted in a loss of transparency and aesthetic appearance. Moreover such windows cracked readily to permit heat to reach the other side of the window.

Other methods for forming fire resistant windows include providing an intumescent gel layer sandwiched over the outer sheets with a space that allows for expansion, as taught in French Patent No. 2,321,575.

In British Patent No. 1,354,497 there is disclosed a fire-proofing glass reinforced plastic which is formed by adding woven glass roving to a surface and applying a resin absorbing tissue and a coating of an intumescent gel. However, the optical clarity is affected.

It is known to make fire resistant panes for non-security installations by placing between two sheets of glass a solid layer of a product which under the action of heat radiation is transformed into an insulating foam, for example a hydrated alkaline silicate. Such panes are described in French Patent No. 2,027,646. Such panes have poor optical transparency and are not reliable for long periods of time. Also, the panes cannot deter physical attack.

U.S. Pat. No. 4,264,681 discloses an aqueous acrylic gel which utilizes an adherence gel to anchor the aqueous acrylic gel to the surface of glass panes. The adherence gel consists of organic titanates, organic zirconates and silanes which react with the double bonds of the acrylic gel.

British Patent No. 1,541,371 discloses a gel for use between glass panes which comprises an acrylic acid derivative and a foaming agent which an alkali metal or the ammonium salt of aluminates, silicates, stannates, plumbates, alums, borates or phosphates. The aqueous acrylic gel forms a heat insulating foam after the window breaks and the gel is exposed to high heat.

U.S. Pat. No. 4,799,346 to Bolten et al, which is herein incorporated by reference, discloses a laminated glazing unit that is interposed between outer sheets of glass or plastic and sets forth ionomer which is useful in the present invention.

SUMMARY OF THE INVENTION

The invention provides a novel intumescent gel which can be utilized between layers of transparent sheets to provide fire resistance with optical clarity at low temperatures. The transparent intumescent gel of the invention comprises about 5 to 30% by weight of acrylamide, about 0 to 4% by weight of a cross linking agent, preferably, N,N'-methylene bisacrylamide, about 5 to 28% by weight of an ammonium or alkali metal salt of an alkanoic acid having 1 to 4 carbon atoms, about 0.05 to 10% by weight of a polymerization catalyst, and water. It is preferable that there is present in the gel of the invention about 40% or more of water.

Optionally, the gel can contain up to about 15% by weight of one or more of sodium silicate, sodium bicarbonate, tetramethyl orthosilicate, silica gel and ethylene glycol.

About 0.1 to 0.5% of N,N,N',N-tetramethyl ethylenediamine (TMEDA) may be used to inactivate any polymerization inhibitors which may be present.

According to a further embodiment of the invention, there is provided a glazing unit having two outer transparent sheets and an inner resinous layer which is separated from the outer sheets by the intumescent gel of the invention. The inner resinous layer is preferably an ionomer of the type disclosed in the aforementioned U.S. Pat. No. 4,799,346, when the glazing unit is to provide penetration resistance and maximum security. The intumescent gel acts both as a coolant for the resinous inner layer and as a dampening agent during an attack by a blunt object.

Therefore, it is an object of the present invention to provide an intumescent gel which can be used with glazing units.

It is a still further object of the invention to provide a heat resistant, projectile resistant optically transparent laminate for psychiatric institutions, windows of vehicles or security installations.

It is another object of the invention to provide a cushion means to allow for temperature related expansion of glass.

Other objects and a fuller understanding of the invention will be had by referring to the following description and claims of a preferred embodiment taken in conjunction with the accompanying drawing.

DESCRIPTION OF THE PREFERRED EMBODIMENTS

Figure 1:
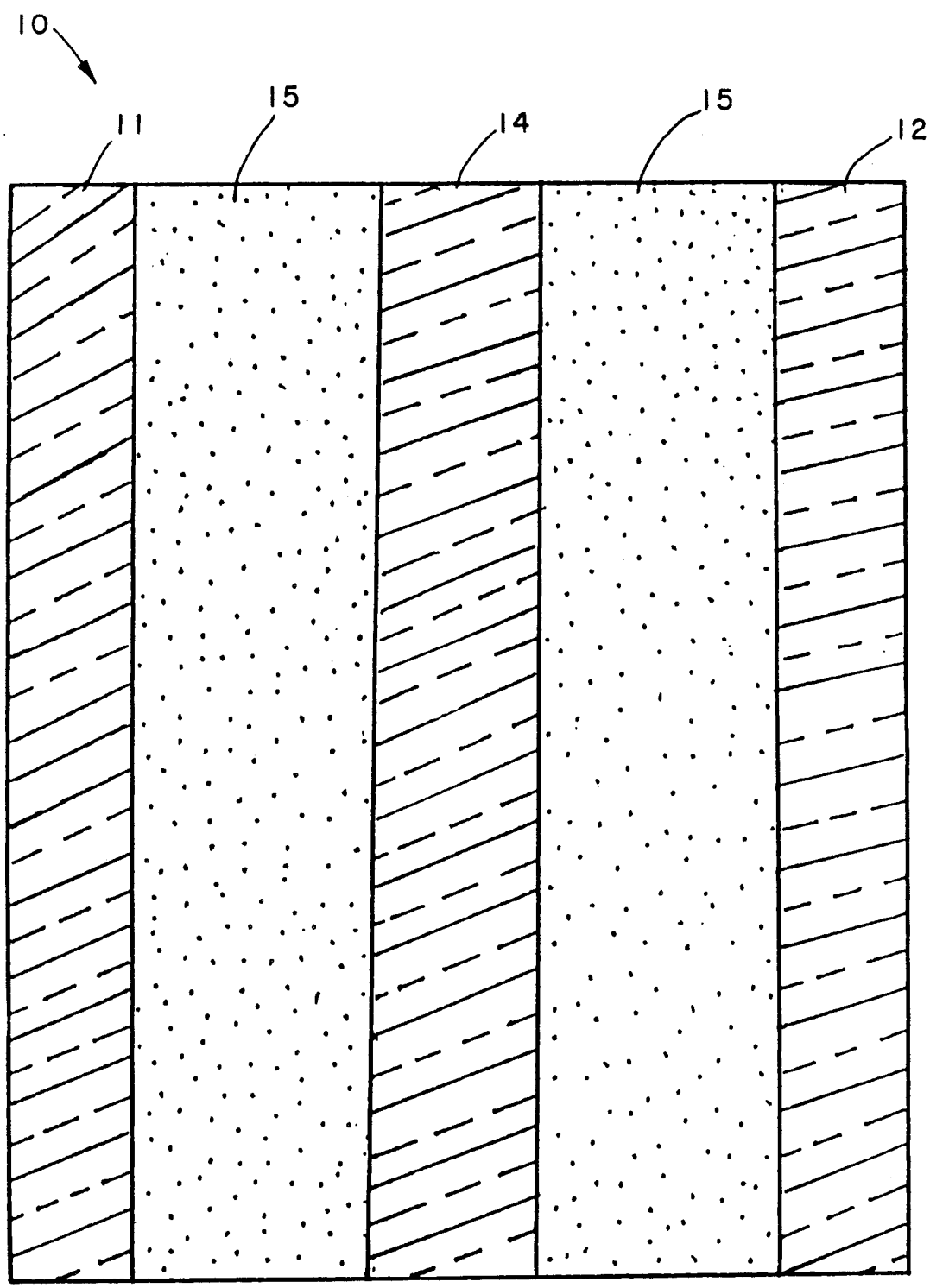
FIG. 1 is a fragmentary sectional view of a laminate of the invention.

Although specific terms are used in the following description for the sake of clarity, these terms are intended to refer only to the particular structure of the invention selected for illustration in the drawing, and are not intended to define or limit the scope of the invention.

It is understood that the following description omits many structural elements commonly found in laminating glazing units for aircraft, such as mounting frames, such as those in U.S. Pat. No. 3,410,739 to Orcutt, temperature sensing devices, such as those shown in U.S. Pat. No. 3,789,191 to Spindler, reinforcing frames such as those shown in the aforesaid Orcutt and Shorr patents and other structural elements well known in the art.

FIG. 1 shows an example of a laminate 10 of the invention. The laminate is formed with parallel transparent outer sheets 11, 12 and an inner resinous layer 14. Intumescent gel layers 15,15' are provided between the outer layers and the inner layer.

The intumescent gel of the invention is generally prepared by adding about 5 to 30% by weight of acrylamide to an aqueous solution of an alkanoic acid salt and then crosslinking the acrylamide with a crosslinking agent such as N,N'-methylene bisacrylamide. A crosslinking agent although preferred is not essential in the composition. The mixture is stirred and a polymerization catalyst such as ammonium persulfate may be added to speed up the gelling reaction.

Freezing point depressants for the gel such as ethylene glycol, sodium bicarbonate, sodium silicate, sodium chloride, and the like can be added.

The preferred freezing point depressants are the ammonium and/or alkali metal salts of the alkanoic acid such as sodium formate, lithium formate, ammonium formate, sodium acetate, and the like.

The laminate 10 can be held within a frame in a conventional manner, for example, as disclosed in any one of U.S. Pat. Nos. 4,321,777; 4,368,226; 2,244,489 or the like. The frame can be provided with means for securing to a supporting structure in a manner dependent upon use and location of the structure. To further secure the laminate in the frame, the frame may be filled with high impact strength resin. Suitable resins include epoxy resins, thermosetting phenolic resins, polymers of caprolactam, and the like. U.S. Pat. No. 4,593,070 to Oyama et al and U.S. Pat. No. 4,593,073 to St. Pierre et al, which are herein incorporated by reference disclose suitable resins.

The thickness of the outer layers 11,12 is usually about 20 mils. The inner resinous layer 14 is usually greater than 30 mils in thickness, preferably about 50 to 60 mils. However, for maximum security the outer layers as well as the inner layers may have a thickness greater than 50 mils. The various thickness depends on location and use of the laminate.

It is also understood while the present invention illustrates an innerlayer of extruded transparent plastic material, the term "innerlayer," as it is contemplated for use of the present invention, may comprise one or more layers of extruded transparent plastic material bonded to one another or made integral to one another with intermediate layers of transparent material of either rigid or flexible nature therebetween. The term "innerlayer" as herein contemplated also includes structures comprising rigid plies of coated or uncoated inonomer or polycarbonate or acrylic or polyester and/or flexible plies of polyurethane, and other esters commonly used as innerlayer materials or combinations of rigid and flexible materials within outer plies of extruded transparent plastic material so that the "innerlayer" has outer surfaces of extruded transparent plastic material facing a glass surface or a coated glass surface.

The innerlayer may comprise one or more layers of polyurethane, polyvinyl butyral resin, polyethylene terephthalate, commercially available as Du Pont's MYLAR, polyesters, ionically cross-linked ethylenemethacrylic acid copolymer or ethylene-acrylic acid copolymer which may be neutralized with a polyamine, and the like.

The polyurethanes preferably used according to the principles of the present invention can broadly be described as the reaction product of a polyisocyanate and polyol which upon lamination forms a transparent layer. The polyurethanes may have thermosetting or thermoplastic properties. Thus, for example, an organic diisocyanate is reacted with a relatively long chain diol and a curing agent which is usually a monomeric compound having at least two active hydrogens per molecule, as determined by the Zerewitinoff test described in Kohler, J. Am. Chem. Soc., 49, 3181 (1927). Suitable polyisocyanates are organic diisocyanates which include aromatic, aliphatic, cycloaliphatic and heterocyclic diisocyanates. Examples are 2,4-toluene diisocyanate, 1,4-butane diisocyanate, 1,2-diisocyanato-methyl cyclobutane, 4,4-methylene-bis (cyclohexyl) diisocyanate 1,10-decane diisocyanate, and furfurylidene diisocyanate.

Suitable long chain diols include polyester diols. The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC—R—COOH wherein R is an alkylene radical containing from 2 to 12, and preferably 4 to 8, carbon atoms inclusive, examples of which are adipic, succinic, palmitic, suberic, azelaic and sebacic moieties. Suitable aliphatic diols contain from 2 to 15 carbon atoms, exemplary of which are ethylene glycol, 1,3-propanediol, 1,4-butanediol and 1,6-hexanediol. The average molecular weight of the polyester diol should be between 750 and 5000, preferably between 1000 and 3300. The preferred polyester diol is poly 1,4-butylene adipate having a molecular weight of about 1800 to 2200. The polyurethanes preferably are used in sheets of about 10 mils to 45 mils in thickness.

The ionomer resin which can be used in the invention is obtained by combining a copolymer of ethylene-methacrylic acid or ethylene-acrylic acid and a polyamine.

In addition, the copolymer can already be partially neutralized with up to 90% of a metal cation such as sodium or other alkali metal, ammonium salt, zinc and an aluminum salt. A particular example of such a copolymer is SURLYN 1601, manufactured by the Polymer Products Department of the DuPont Company.

The outer sheets which may be used in the invention may be any well known commercial plate, float or sheet glass composition, tempered glass is most preferable, polycarbonate resin, fused acrylic/polycarbonate resins, acrylic resins, polyurethanes, ionomer resins, diallyl glycol carbonate resins and the like. The polycarbonate is generally used in sheets of about 5 to 250 mils in thickness. The sheets may be coated with an abrasion resistant coating.

The intumescent gels used in the invention should be optically transparent and substantially non-degradable upon standing for long periods of time. Intumescent materials which are not gels such as the clear polyurethane coatings disclosed in U.S. Pat. No. 3,497,469 do not provide good optical clarity. In addition, there is a tendency to delaminate. The layers of gel are generally about 0.25 to 0.50 inches in thickness. It has been found that the gel not only provides the resistance to heat and fire but additionally provide a cushion which prevents chipping and stress cracking when installing in a supporting frame and as a thermal expansion cushion for the adjacent layers.

Primers may also be used to promote adhesion between the ionomer resin, the glass and polycarbonate respectively. Primers suitable for glass, and the glass/ionomer resin interface in particular, may include silanes, such as those produced under the registered trademarks "Z-6040" and "Z-6020" by Dow Chemical Company. Other primers suitable for the polycarbonate/ionomer resin interface in particular, include organic amines, usually in a diluted solution with an inert solvents (unlikely to attack the polycarbonate, e.g., alkanes and alcohols), such as aliphatic or polyethylene amines or ethanolamines, and specifically diethylenetriamine. Other specific primers include diisocyanates (toluene diisocyanatate) and polyacrylic acid (produced under the registered trademark ACRYSOL by the Rohm and Haas Company).

In some cases, primers may also be used to promote adhesion of the intumescent gels to their adjacent surfaces.

When the outside surface is a polymeric sheet it is sometimes advisable to provide the exposed surface with a hard coat to prevent scratch, abrasion or other damage. Useful hard coats which have optical clarity are organosilicon products such as described in U.S. Pat. No. 4,027,073. These products can also serve as barrier coatings on the inner layer.

Specific embodiments of the above basic panel may assume various shapes and the arrangement of the panel components may vary depending upon particular design requirements. Additional components such as temperature control sensing devices may be incorporated into the basic panel structure.

The sheets of glass used in the panel may be of the same or different sizes. The peripheral margins of the innerlayer materials may be cut flush with the edges of the adjacent glass sheets and/or may extend beyond the edges of some of the glass sheets to provide in itself a resilient means for supporting the laminated glass assembly. The innerlayer may be provided with inserts which have characteristics that inhibit delamination and a phenomenon known as "cold chipping." Where an innerlayer has extended portions, these portions may include innerlayer inserts for reinforcement of the interlayer material. Electrical terminal blocks may be mounted on any desired surface of the panel which is accessible for power lead attachment purposes when the panel has been mounted on the support body.

The laminated articles of this invention have utility in a variety of different environments including security installations, armored vehicles, banks, factories, airplanes, space vehicles, submarines, and the like.

The following examples are illustrative of the gels of the invention. It will be understood, however, that it is not to be construed in any way limitative of the full scope of the invention since various changes can be made without departing from the spirit of the teachings contained herein, in the light of the guiding principles which have been set forth above.

All percentages herein stated are based on weight except wherein noted.

EXAMPLE I

A gel of the invention is prepared as follows:

| Ingredients | % by Weight |
| --- | --- |
| Acrylamide | 12.5 |
| Sodium formate | 15.0 |
| N,N'-Methylene bisacrylamide | 0.3 |
| Catalyst | 0.3 |
| N,N,N',N-Tetramethylethylene diamine (Tmeda) | 0.1 |
| Water | q.s. |

All the ingredients except the catalyst are placed into a 15% solution of sodium formate and stirred until clear. The catalyst is then added and the mixture is poured into a mold.

EXAMPLE II

Following the procedure of Example I, a gel is prepared from the following composition:

| Ingredients | % by Weight |
| --- | --- |
| Sodium formate | 10.0 |
| Acrylamide | 12.0 |
| Luddox | 12.0 |
| N,N'-Methylene bisacrylamide | 0.1 |
| Tmeda | 0.05 |
| Ammonium persulphate | 3.0 |
| Ethylene glycol | 4.0 |
| Water | q.s. |

EXAMPLE III

Following the procedure of Example I, a gel is prepared from the following composition:

| Ingredients | % by Weight |
| --- | --- |
| Acrylamide | 14.0 |
| Sodium formate | 20.0 |
| N,N'-Methylene bisacrylamide | 0.75 |
| Ammonium persulphate | 6.0 |
| Tetramethyl orthosilicate | 1.0 |
| Water | q.s. |

If desired other temperature depressants such as sodium bicarbonate, sodium chloride or ethylene glycol may be added.

The form of the invention shown and described herein represents an illustrative preferred embodiment and variations thereof. It is understood that various changes may be made without departing from the gist of the invention as defined in the claims.

We claim:

1. An optically transparent aqueous intumescent gel for use with transparent laminates said gel being formed from a composition consisting essentially of about 5 to 30% by weight acrylamide, about 0 to 4% by weight of a crosslinking agent, about 5 to 28% by weight of an ammonium or alkali metal salt of an alkanoic acid having 1 to 4 carbon atoms, about 0.05 to 10% by weight of a polymerization catalyst, and water.

2. The gel of claim 1 wherein said crosslinking agent is N,N'-methylene bisacrylamide.

3. The gel of claim 1 wherein said alkali metal salt of an alkanoic acid is sodium formate.

4. The gel of claim 1 wherein said alkali metal salt of an alkanoic acid is sodium acetate.

5. The gel of claim 1 wherein said catalyst in ammonium persulphate.

6. The gel of claim 1 including N,N,N',N-tetramethylethylenediamine.

7. The gel of claim 1 including a melting point depressant selected from the group consisting of sodium bicarbonate, sodium silicate, sodium chloride and ethylene glycol.

8. An optically transparent aqueous intumescent gel for use with transparent laminates comprising about 5 to 30% by weight of acrylamide polymer crosslinked with N,N-methylene bisacrylamide, about 5 to 28% by weight of sodium formate, and water.

9. The gel of claim 8 including a melting point depressant selected from the group consisting of sodium bicarbonate, sodium silicate, sodium chloride and ethylene glycol.

* * * * *